3,152,096
VINYL CHLORIDE POLYMERS PLASTICIZED
WITH BENZYL PHTHALATE COMPOUNDS
Joseph R. Darby, Webster Groves, Mo., assignor to Monsanto Company, a corporation of Delaware
No Drawing. Filed Jan. 11, 1962, Ser. No. 165,658
14 Claims. (Cl. 260—30.4)

This invention relates generally to a composition containing a polymerized vinyl chloride resin, and more particularly to a composition comprising a polymerized vinyl chloride resin and certain high temperature plasticizers therefor.

Hard surface floor coverings are more widely used today than ever before. In particular plastic floor coverings containing a thermoplastic resin as a binder instead of linoleum cement are finding more and more applications throughout the country. Wider use of plastic floor covering has made it necessary to produce the floor covering in a great variety of colors and patterns, many of which are of pastel shade or of other light color; even white floorings, or floorings containing a great deal of white, are in use.

Use of these light-colored plastic floorings has produced an unexpected problem throughout the industry. Those parts of light-colored plastic floorings subjected to heavy traffic have developed undue brownish or yellowish stains. This phenomenon, known as traffic staining, now constitutes one of the major problems in the use of light-colored plastic floorings in heavy traffic areas. The industry has devoted much research time and effort in an attempt to solve it, but no good solution has been found as yet. It has been learned that the traffic staining problem appears to be related to the plasticizer used with the polymerized vinyl chloride resin binder in the flooring, but to date all efforts to find a suitable plasticizer which will eliminate or minimize traffic staining has so far been unavailing.

It is the primary object of the present invention to supply a plasticized polymerized vinyl chloride resin composition suitable for use in a plastic flooring binder which will reduce or eliminate the traffic staining phenomenon. A further object is to present a plastic floor covering binder having increased strength when used in a floor covering while at the same time minimizing traffic staining.

These objects are achieved in a straight-forward and unexpected manner. The invention contemplates a plastic floor covering binder comprising a polymerized vinyl chloride resin selected from the group consisting of polyvinyl chloride, vinyl chloride-vinyl acetate copolymers, and mixtures thereof. As a high temperature plasticizer for the polymerized vinyl chloride resin, the invention contemplates about 5 to 100 parts by weight of an ether alcohol benzyl phthalate per 100 parts by weight of the polymerized vinyl chloride resin. Within this wider range, it is preferred to employ from about 30 to 50 parts of plasticizer per 100 parts of resin.

The polymerized vinyl chloride resins to be used in the compositions of the present invention may be those low to medium molecular weight resins available in commerce. Exemplary of such resins are the vinyl chloride-vinyl acetate copolymers containing about 3%–5% vinyl acetate made by the Bakelite Company and bearing the designations "VYMF," and "VYVF." The copolymers containing about 13% vinyl acetate such as those designated "VYNW," and "VYHH," are suitable. Straight polyvinyl chloride resins such as those designated Geon and Opalon resins, particularly "Geon 121," "Geon 126" and "Opalon 630" are suitable. Mixtures of the straight polymer and the copolymers will frequently be used. The most significant property of the polymerized vinyl chloride resins suitable for use in the compositions of the present invention is that of yielding a hard, tough and otherwise suitable surface covering material after being plasticized and admixed with suitable fillers and other ingredients and formed into a surface covering material.

Generally speaking the present composition to be used as a binder comprises about 50% to about 25% by weight of the wearing surface composition of the floor covering. The binder is admixed with filler, including pigment, in such proportions that the filler comprises about 50% to about 75% by weight of the composition. When the filler content is below about 50%, pattern control may be difficult. When more than about 75% by weight of filler is present, the physical properties of the finished surface covering materials do not measure up to the desired standards in the floor covering art. The filler material may be organic or inorganic, or mixtures thereof. The filler often includes a preponderant proportion by volume of fibrous filler, such as wood flour, cork particles, asbestos, other mineral fibers, and the like. The remainder of the filler component is comprised of finely divided particles such as whiting, clay, silica, slate flour, and similar non-fibrous filler material. If the flooring is destined to be installed below grade, then it is preferred that the filler system consist of inorganic fillers, fibrous or non-fibrous or both. Such a filler system is insensitive to the alkaline moisture conditions encountered on below grade or on grade installations. Also included in the filler component are small but effective amounts of lubricants and detackifying agents, such as for example stearic acid, paraffin wax, ceresin wax, oleic acid and lauric acid. Synthetic rubber such as the butadiene-styrene copolymers, or the butadiene-acrylonitrile copolymers may be added. The addition of these rubbers renders the composition sulfur-curable whereupon vulcanizing agents and curing accelerators may then be added to the filled composition. Thus there may be added sulfur, or sulfur containing compounds, along with various vulcanization accelerators as for example zinc phenyl ethyl dithiocarbamate, diethyl dithiocarbamate, zinc isopropyl dithiocarbamate, zinc diethyl dithiocarbamate, zinc phenyl ethyl dithiocarbamate, diphenyl guanidine, tetraethyl thiuram disulfide, and tetramethyl thiuram disulfide. Stabilizers or anti-oxidants such as hydroquinone, N-phenyl alpha naphthylamine, N-phenyl beta naphthylamine, N,N'-exomethylene-bis-ortho-hydroxy benzamide, sodium acid phosphate, dibutyl tin dilaurate, and others known in the art may be used. The total amount of the compounding agents exclusive of the fibrous and non-fibrous filler generally runs up to about 10% by weight of the filler. The plasticizers usually incorporated into the composition are dioctyl phthalates, dicapryl phthalate, dibutyl sebacate, dibutoxy ethyl phthalate, tricresyl phosphate, dibutyl phthalate, N-alkyl toluene sulfonamide, and other known plasticizers. Epoxidized plasticizers may be used such as the epoxidized soybean oil fatty acids. Various polymeric plasticizers have also been used.

The plasticizers of this invention may be termed ether alcohol benzyl phthalates. Such phthalates have the general formula

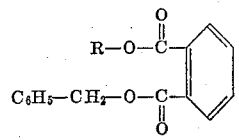

where R is selected from the group consisting of furfuryl, tetrahydrofurfuryl and $X(OCH_2CH_2)_m$ where $m$ is an integer from 1 to 3 and X is selected from the group consisting of methyl, ethyl, phenyl and benzyl. As illustrative of the plasticizers within the scope of said formula are furfuryl benzyl phthalate, tetrahydrofurfuryl benzyl phthalate, methoxyethyl benzyl phthalate, ethoxyethyl benzyl phthalate, phenoxyethyl benzyl phthalate, benzyloxyethyl benzyl phthalate, methoxyethoxyethyl benzyl phthalate, ethoxyethoxyethyl benzyl phthalate, phenoxyethoxyethyl benzyl phthalate, benzyloxyethoxyethyl benzyl phthalate, methoxyethoxyethoxyethyl benzyl phthalate, ethoxyethoxyethoxyethyl benzyl phthalate, phenoxyethoxyethoxyethyl benzyl phthalate and benzyloxyethoxyethoxyethyl benzyl phthalate.

In general, the plasticizers of this invention are prepared by reacting phthalic anhydride with a slight molar excess of the desired ether alcohol, triethylamine and benzyl chloride. The first two reactants are heated, and the triethylamine is added slowly. When part of the amine is in, the temperature is raised, and the benzyl chloride and the rest of the amine are added. Hydrogen chloride is added to form the amine hydrochloride, and the phthalate product is worked up with a series of water and caustic washes.

The following examples will serve to further illustrate the preparation of the plasticizers of this invention and the use of such plasticizers in vinyl resins.

*Example I*

A suitable reaction vessel is charged with 222.3 grams (1.5 moles) of phthalic anhydride and 181.8 grams (1.51 moles) of methoxyethoxyethanol. The mixture is stirred and heated to about 130°–140° C. Over a period of about 30 minutes, 159.5 grams (1.575 moles) of triethylamine and 203.2 grams (1.61 moles) of benzyl chloride are slowly added. After all of the materials are in, there are added 180 ml. of water and 5 ml. of hydrogen chloride. The reaction mixture is then washed with water, with 20% sodium hydroxide and again with water. It is then steamed at 125°–130° C. at 90 mm. to yield 495.9 grams of methoxyethoxyethyl benzyl phthalate. This product is treated with peracetic acid, after which it is washed with water and 20% sodium hydroxide and dried. There is obtained 491.7 grams (91.4% of theory) of methoxyethoxyethyl benzyl phthalate.

*Example II*

A suitable reaction vessel is charged with 408.0 grams (2.75 moles) of phthalic anhydride and 282.6 grams (2.76 moles) of tetrahydrofurfuryl alcohol. The mixture is stirred and heated to about 130°–140° C. Over a period of about one hour, 293.0 grams (2.89 moles) of triethylamine and 373.0 grams (2.95 moles) of benzyl chloride are slowly added. After all of the materials are in, there are added 330 ml. of water and 16 ml. of hydrogen chloride. The reaction mixture is then washed with water, with 20% sodium hydroxide and again with water. It is then steamed at 130° C. at 80–90 mm. to yield 868.9 grams of tetrahydrofurfuryl benzyl phthalate. This product is treated with peracetic acid, after which it is washed with water and 20% sodium hydroxide and dried. There is obtained 856.5 grams (91.5% of theory) of tetrahydrofurfuryl benzyl phthalate.

*Example III*

Two flooring compositions were prepared in a conventional manner. One such composition was employed as a control, and the other composition contained one of the novel plasticizers of this invention. The ingredients were as hereinafter tabulated:

| Ingredients | Control [1] | Other [1] |
|---|---|---|
| Polyvinyl chloride | 100 | 100 |
| Di-(2-ethylhexyl) phthalate | 30 | |
| Methoxyethoxyethyl benzyl phthalate | | 37.5 |
| Limestone | 180 | 180 |
| Titanium dioxide | 15 | 15 |
| Stearic acid | .5 | .5 |
| Paraffin wax | .5 | .5 |
| Barium-zinc fatty acid salt stabilizer | 5 | 5 |

[1] All figures are parts by weight.

After the usual mixing and sheet-forming operations, test installations were made wherein white floor coverings in the form of sheets having the above formula were installed in heavy traffic areas. After four months installation time, the control flooring was appreciably darker and carried a heavier yellow permanent traffic stain than did the other installation.

While this invention has been described with respect to certain specific embodiments, it is not so limited. It is to be understood that variations and modifications thereof may be made without departing from the spirit and scope of the invention.

The embodiments of the invention in which an exclusive property or privilege is claimed are defined as follows:

1. A composition of matter comprising a polymerized vinyl chloride resin selected from the group consisting of polyvinyl chloride, vinyl chloride-vinyl acetate copolymer, and mixtures thereof, and from about 5 to 100 parts by weight, per 100 parts by weight of resin, of a benzyl phthalate of the formula

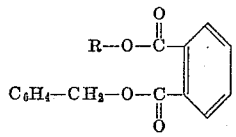

where R is selected from the group consisting of furfuryl, tetrahydrofurfuryl and $X(OCH_2CH_2)_m$ where $m$ is an integer from 1 to 3, and X is selected from the group consisting of methyl, ethyl, phenyl and benzyl.

2. A composition as defined in claim 1 wherein R is $CH_3(OCH_2CH_2)_m$.

3. A composition as defined in claim 1 wherein R is $CH_3CH_2(OCH_2CH_2)_m$.

4. A composition as defined in claim 1 wherein R is $C_6H_5(OCH_2CH_2)_m$.

5. A composition as defined in claim 1 wherein the benzyl phthalate is tetrahydrofurfuryl benzyl phthalate.

6. A composition as defined in claim 1 wherein the benzyl phthalate is methoxyethoxyethyl benzyl phthalate.

7. A composition as defined in claim 1 wherein from about 30 to 50 parts by weight of benzyl phthalate are employed per 100 parts by weight of resin.

8. A composition of matter comprising polyvinyl chloride and from about 5 to 100 parts by weight, per 100 parts of polyvinyl chloride, of a benzyl phthalate of the formula

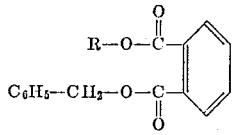

where R is selected from the group consisting of furfuryl, tetrahydrofurfuryl and $X(OCH_2CH_2)_m$ where $m$ is an integer from 1 to 3 and X is selected from the group consisting of methyl, ethyl, phenyl and benzyl.

9. A composition as defined in claim 8 wherein R is $CH_3(OCH_2CH_2)_m$.

10. A composition as defined in claim 8 wherein R is $CH_3CH_2(OCH_2CH_2)_m$.

11. A composition as defined in claim 8 wherein R is $C_6H_5(OCH_2CH_2)_m$.

12. A composition as defined in claim 8 wherein the benzyl phthalate is tetrahydrofurfuryl benzyl phthalate.

13. A composition as defined in claim 8 wherein the benzyl phthalate is methoxyethoxyethyl benzyl phthalate.

14. A composition as defined in claim 8 wherein from about 30 to 50 parts by weight of benzyl phthalate are employed per 100 parts by weight of resin.

References Cited in the file of this patent

UNITED STATES PATENTS

| | | |
|---|---|---|
| 2,537,595 | Levy et al. | Jan. 9, 1951 |
| 2,607,798 | Weesner | Aug. 19, 1952 |
| 3,020,253 | Lukes | Feb. 6, 1962 |
| 3,085,078 | Fath | Apr. 9, 1963 |